March 12, 1957 — I. JEPSON — 2,785,277
AUTOMATIC COOKING DEVICE
Filed Oct. 22, 1952 — 5 Sheets-Sheet 1

INVENTOR.
Ivar Jepson
BY
McCanna & Morsbach
Attys.

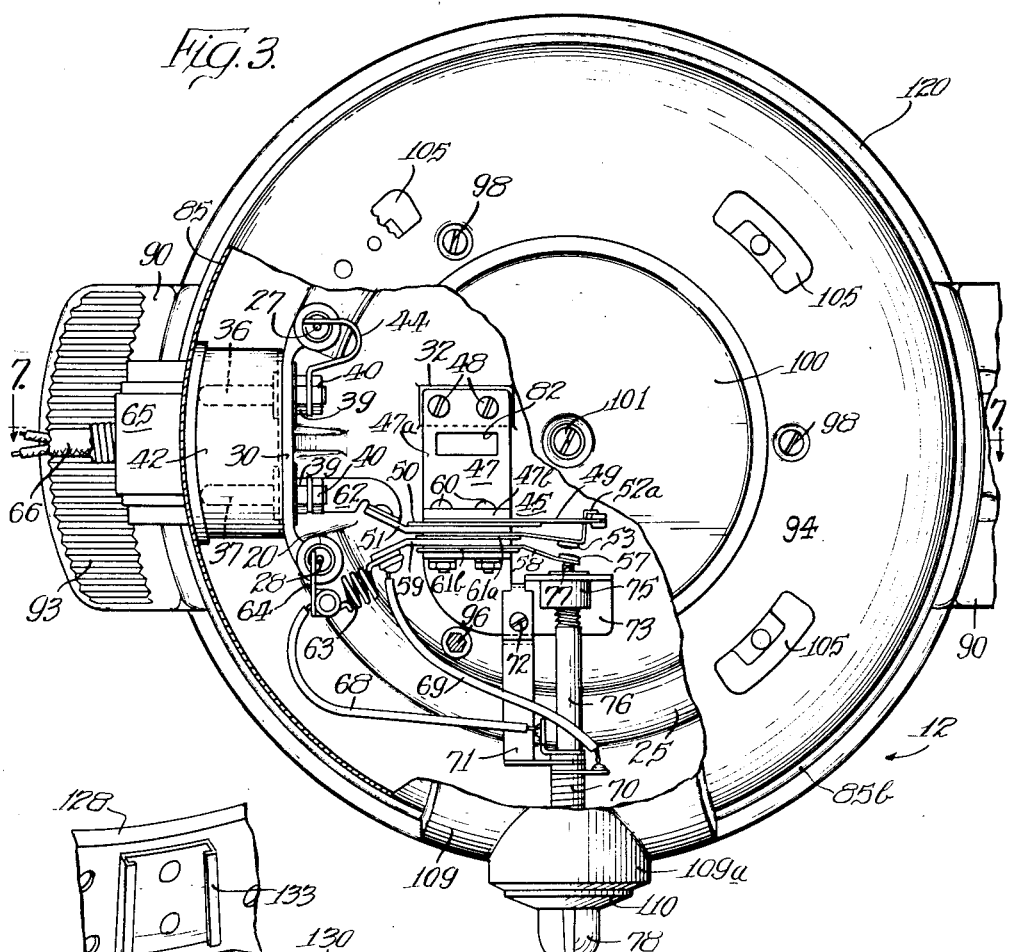

March 12, 1957     I. JEPSON     2,785,277
AUTOMATIC COOKING DEVICE
Filed Oct. 22, 1952     5 Sheets-Sheet 3

INVENTOR.
Ivar Jepson
BY
McCanna & Morsbach
Attys.

March 12, 1957  I. JEPSON  2,785,277
AUTOMATIC COOKING DEVICE
Filed Oct. 22, 1952  5 Sheets-Sheet 4
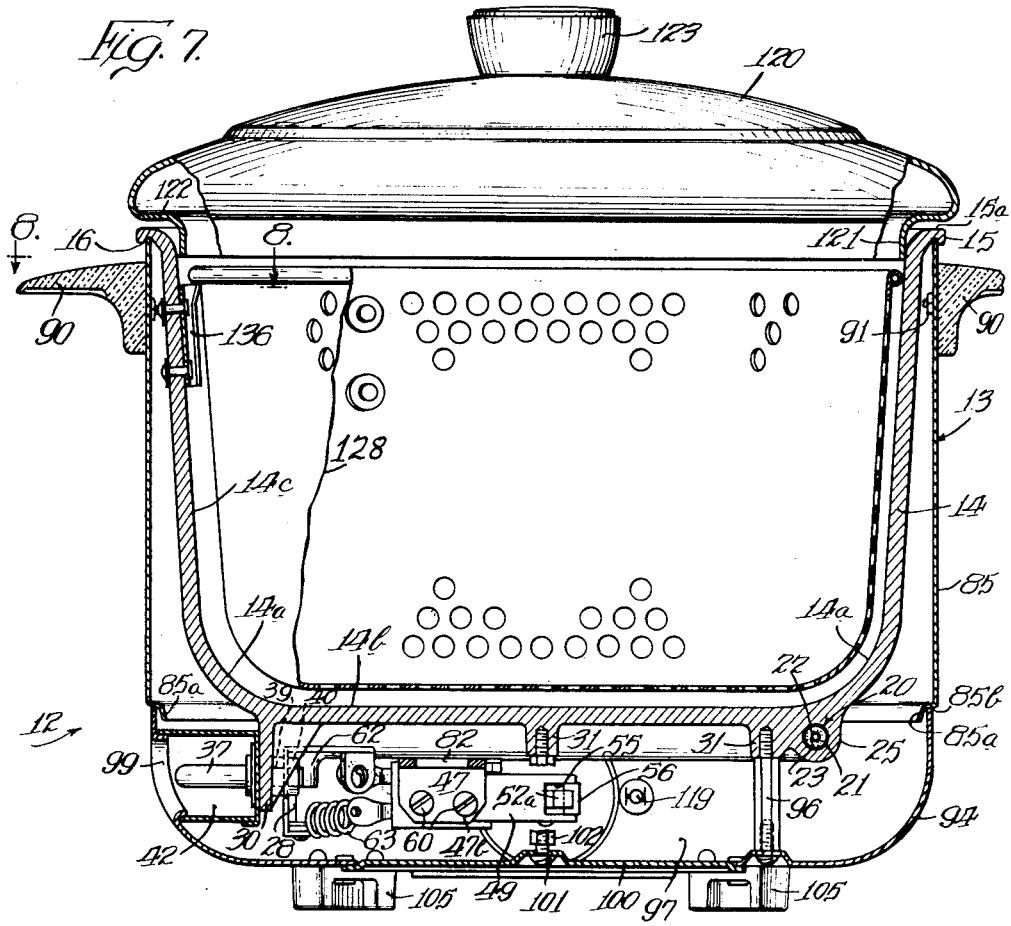
INVENTOR.
Ivar Jepson
BY
McCenna & Morsbach
Attys.

March 12, 1957  I. JEPSON  2,785,277
AUTOMATIC COOKING DEVICE
Filed Oct. 22, 1952  5 Sheets-Sheet 5
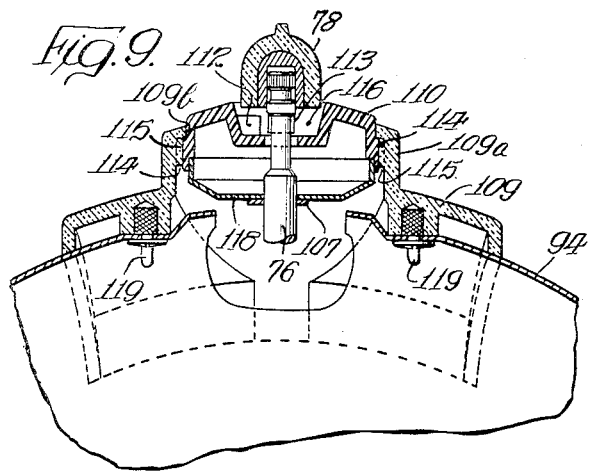
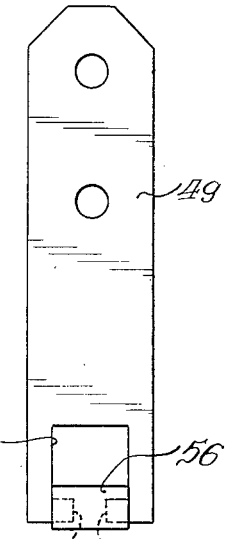
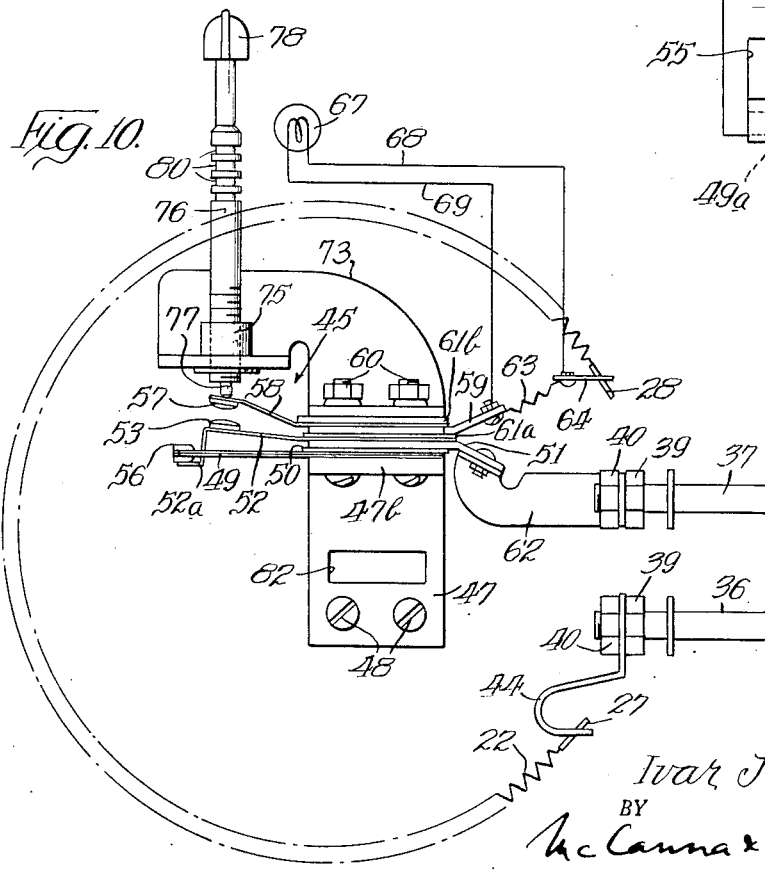
INVENTOR.
Ivar Jepson
BY
McCanna & Morsbach
Attys.

United States Patent Office 2,785,277
Patented Mar. 12, 1957

2,785,277
AUTOMATIC COOKING DEVICE

Ivar Jepson, Oak Park, Ill., assignor to Sunbeam Corporation, Chicago, Ill., a corporation of Illinois Application October 22, 1952, Serial No. 316,209

1 Claim. (Cl. 219—44)

The present invention relates to an automatic cooking device, and more particularly to an automatic electric cooking device especially designed for various cooking operations including what is often referred to as deep fat frying.

There has been a demand for a long time for a cooking device especially designed for deep fat frying. Electric ranges have been designed with deep well cookers whose alleged purpose was to facilitate deep fat frying. Also, numerous so-called deep fat fryers have appeared on the market in recent years, but none of them have been entirely satisfactory. In the first place, it will readily be appreciated that when the cooking operation is completed and the vessel is permitted to cool, a substantial cleaning problem is presented due to the cooling of the shortening and contained cooking particles which tend to adhere to the vessel. It is essential, therefore, that a deep fat fryer be designed in a manner which makes the ability to clean the same one of the most important features thereof. Such a deep fat fryer must include a vessel which is round and which has no ridges or ledges contained therein. It should also have a polished surface at least where it comes in contact with the shortening, and it should have a flat bottom. Deep fat fryers have been designed which include a drain spout to drain the shortening therefrom upon completion of the cooking operation. Such arrangements, however, have been entirely unsatisfactory, since they present a much more complicated cleaning problem, it being almost impossible to clean such a drain spout, the interior of which becomes coated with grease mixed with cooked particles of food. It is desirable, therefore, that a deep fat fryer have a smooth interior construction, preferably being shaped like a saucepan with no ridges or ledges, and which has a round pouring edge to permit the pouring of the liquid shortening contained therein from the vessel in a simple manner.

In an automatic deep fat fryer, it is important to have accurate temperature control so that the desired cooking may be carried on in the correct manner without trial and error, as is the case with cooking devices in general use. It is also essential that when it is desired to start a cooking operation the cooking device may be brought up to the desired temperature in a minimum period of time, and by bringing the cooking device to a desired temperature it is meant that the shortening contained therein be brought to a desired temperature in a minimum of time. It will be appreciated that shortening, such as used in deep fat frying, is a poor conductor of heat. In fact, it is a heat insulator. Obviously, a heating device applied to a vessel will cause the vessel temperature to rise several hundred degrees above the temperature of the shortening contained therein during the initial heating operation before steady state conditions are obtained. Any thermostatic control device responsive to the temperature of the bottom of the vessel will, therefore, shut off the heat long before the shortening contained therein is at the proper temperature, and any temperature responsive control means disposed directly within the shortening being heated in the vessel is, of course, impractical for several reasons, including the cleaning problem. It would be desirable, therefore, to provide in a deep fat fryer automatic temperature responsive control means which will greatly decrease the preheat time when initially melting the shortening contained therein and yet which will maintain an accurate control of temperature once the proper cooking temperature has been reached.

Deep fat fryers are operated at relatively high temperatures, and it is important that the housewife using the deep fat fryer be fully protected from the high temperatures at all times. Also, deep fat fryers require a conventional drain basket whereby the excess shortening may be drained from the cooked particles upon completion of the cooking operation. It is desirable, therefore, to provide arrangements which will permit this in a simple manner with no discomfort to the housewife, and which draining facilities can readily be cleaned in the same manner as the other parts of the deep fat fryer.

Obviously, a deep fat fryer which has all the features enumerated above will be an item having a substantial cost, and, since foods which require deep fat frying are not conventionally served at every meal in the ordinary home, it would be desirable that such a deep fat fryer would also have application as a general cooking device, such as for making stews, baked beans, and various other dishes including roasts and the like, so that the cooking device including the deep fat frying feature in effect supplements the other cooking facilities which may be available to the housewife.

Accordingly, it is an object of the present invention to provide a new and improved cooking device particularly adapted for what is known as deep fat frying.

It is another object of the present invention to provide a deep fat fryer which is unusually easy to clean.

It is a further object of the present invention to provide a cooking device including a deep fat fryer which is of sturdy construction, which may be assembled in a simple and foolproof manner, and which is designed to provide long years of satisfactory service.

A further object of the present invention resides in the provision of a cooking device particularly adapted for deep fat frying, wherein automatic temperature responsive means are provided to reduce the preheat time to a minimum and yet maintain accurate temperature control following the preheat time and during the cooking operation.

It is a further object of the present invention to provide automatic control means for maintaining a uniform cooking temperature in a cooking device including a deep fat fryer with simple means to indicate the heating condition at all times.

Further objects and advantages of the present invention will become apparent as the following description proceeds, and the features of novelty which characterize the invention will be pointed out with particularity in the claim annexed to and forming a part of this specification.

For a better understanding of the present invention, reference may be had to the accompanying drawings in which:

Fig. 3 is a somewhat enlarged bottom view of the deep fat fryer shown in Fig. 1, with certain portions thereof cut away;

Fig. 4 is an enlarged fragmentary exploded perspective view of a portion of Fig. 2 of the drawings;

Fig. 7 is a sectional view similar to Fig. 5 but taken at an angle of 90° relative to the sectional view of Fig. 5 and in fact along line 7—7 of Fig. 3;

Fig. 8 is an enlarged fragmentary sectional view taken on line 8—8 of Fig. 7, assuming that Fig. 7 shows the complete structure;

Fig. 9 is an enlarged fragmentary view taken on line 9—9 of Fig. 1;

Fig. 10 is a somewhat schematic circuit diagram illustrating the electrical control circuit of the cooking device of the present invention; and Fig. 11 is an enlarged view of the bimetallic element employed in connection with the control circuit of Fig. 10.

Figure 1:
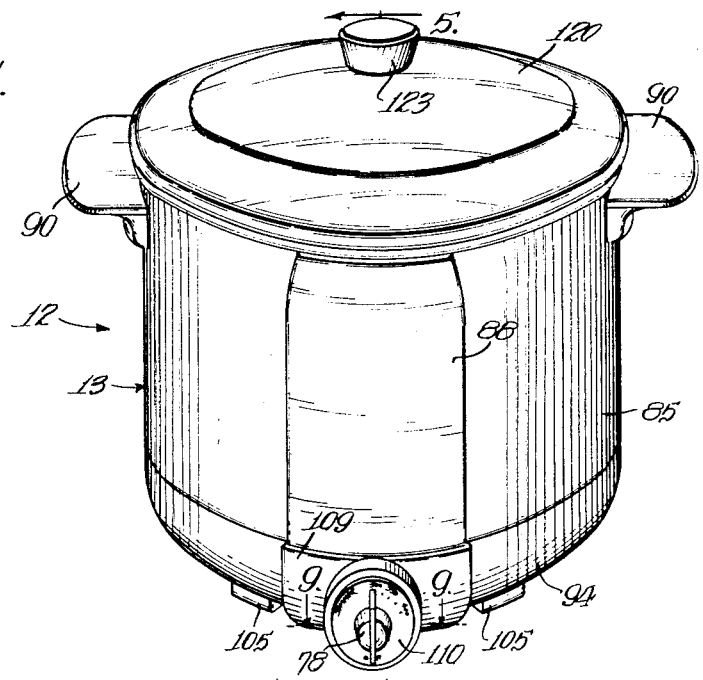
Fig. 1 is a perspective view of the cooking device of the present invention with the cover thereof in the position it would assume during a cooking operation as distinguished from a deep fat frying operation.

Preferably, the present invention is concerned with a cooking device having a cylindrical cooking vessel portion with a highly polished interior, including a flat bottom, so that easy cleaning is possible under all conditions. This vessel is supported in insulated relationship with a suitable exterior housing of pleasing appearance. A suitable thermostatic control means with a substantial thermal lag built into the device to reduce the preheat time when the cooking device is used as a deep fat fryer is included. All the facilities for deep fat frying, including the drain basket, are designed for easy cleaning and include improved demountable handle means, drain support means and the like.

The cooking device and deep fat fryer of the present invention is generally designated by the reference numeral 12 and comprises an outer housing 13 of pleasing appearance within which is supported a cooking vessel generally designated at 14 which embodies numerous features of the present invention.

For the purpose of providing a deep fat fryer which is particularly adapted for easy cleaning, the cooking vessel 14 is preferably a bowl open at the top which has a highly polished interior and which is free of any ridges, ledges, depressions or the like. Obviously, a circular cooking vessel is much easier to clean than a rectangular one, since corners always present a cleaning problem. Consequently, the cooking vessel 14 is round or cylindrical, has a flat bottom to avoid any depressions, and has a smoothly curved portion 14a joining the flat bottom 14b thereof with the outwardly tapering side walls 14c thereof. Also in accordance with the present invention, the cooking vessel 14 is provided around its open end with a peripheral flange 15 defining a smooth and round pouring edge 15a, so that the liquid shortening contained therein may be poured therefrom over a smooth, easy to clean surface. For a purpose which will become apparent as the following description proceeds, the underside of the peripheral flange 15 is provided with a shallow annular groove 16. Preferably, the vessel 14 is formed of aluminum cast in a permanent steel mold or the like, which latter process is preferable since it results in casting with a minimum of blow holes, so that when the interior thereof is subsequently polished a very smooth and satisfactory surface is obtained.

Figure 5:
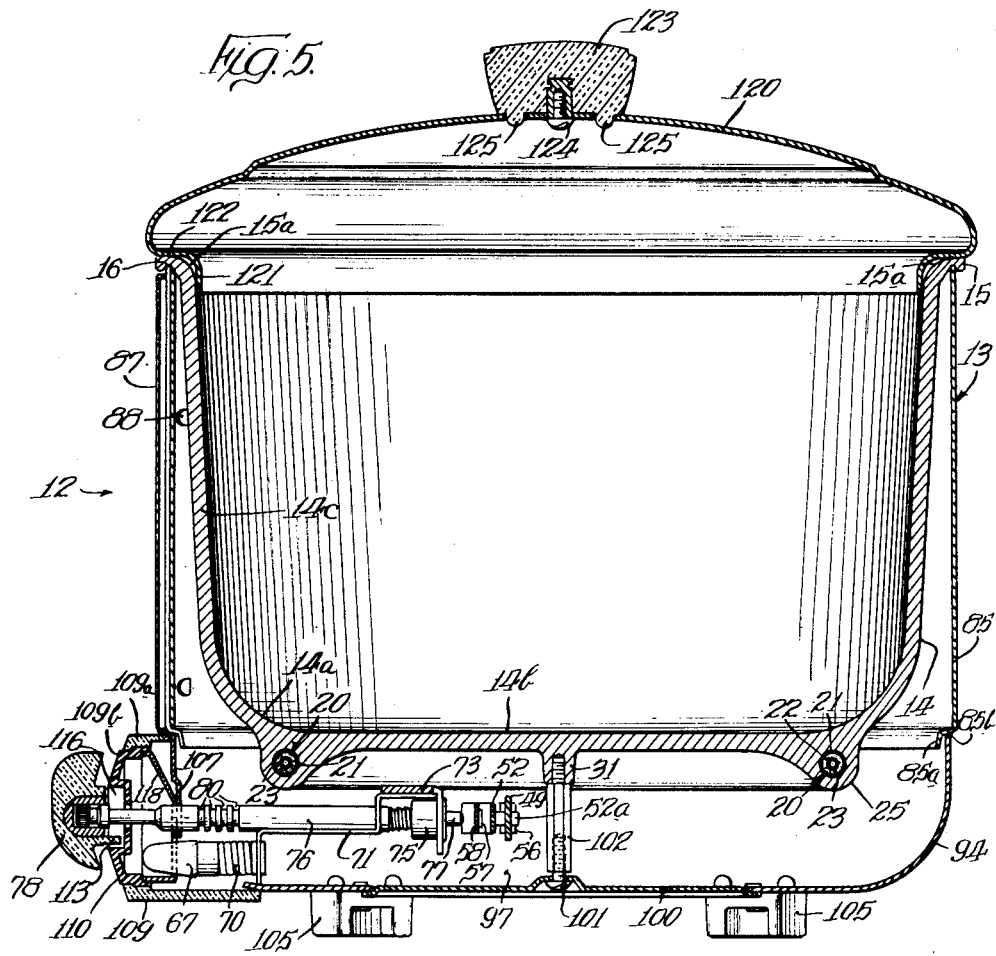
Fig. 5 is an enlarged sectional view taken on line 5—5 of Fig. 1.
Figure 6:
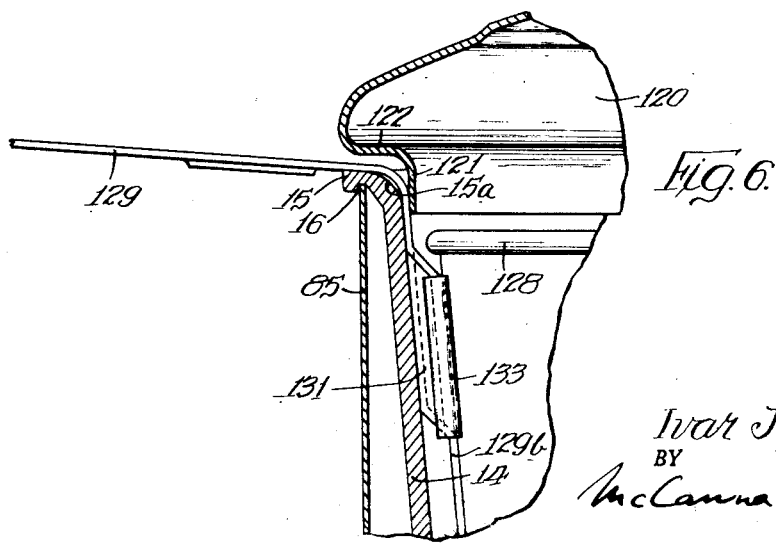
Fig. 6 is a fragmentary view illustrating another position of the parts shown in Fig. 2 of the drawings.

In order to heat the cooking vessel 14, there is provided a suitable heating element generally indicated at 20, best shown in Figs. 3, 5 and 7 of the drawings. Such a heating element is preferably one of the well known sheathed type heating units which conventionally comprises an outer metal sheath within which is disposed a suitable length of resistance wire, such, for example, as nichrome wire coiled in the form of a helix. As illustrated, a sheath 21 has a coiled resistance wire 22 (see also Fig. 10 of the drawings) disposed therein. Surrounding the coiled resistance wire 22 within the sheath 21 is a refractory composition indicated at 23 and commonly formed of fused magnesium oxide which centers the resistance element and which, furthermore, is a good conductor of heat and yet an excellent electrical insulator. Preferably, the sheathed heating element 20 is bent into the form of a substantially one-turn ring, sometimes referred to as a C-shaped heating element, having a diameter somewhat smaller than the diameter of the vessel 14. Preferably, also, the sheathed heating element 20 in the form of a ring is cast within a raised rib 25 during a casting operation of the vessel 14, with the rib in effect comprising an annular rib around the bottom of the vessel, as clearly shown in Fig. 5 of the drawings. The ends of the sheathed heating element are preferably bent downwardly so that suitably rigid terminal portions 27 and 28 (see Figs. 3 and 10 of the drawings) defining each end of the resistance 22 extend in a substantial vertical direction, and the fused magnesium oxide or other suitable insulation 23 which is already present in the sheathed heating element provides the insulation for insulating the ends of the heating element from the conducting portions of the vessel 14.

In order to support certain portions of the electrical control circuit for controlling the heating of the sheathed heating element 20, an integral web or downwardly depending flange 30 is formed during the casting operation of the vessel 14, which, as is best shown in Figs. 3 and 7 of the drawings, extends between the ends of the C-shaped heating element. Also cast integrally with the vessel 14 on the underside thereof are a plurality of lugs 31 for receiving suitable fastening means to hold the cooking device 12 of the present invention in assembled relationship. Additionally, there is cast integrally with the heating vessel 14 a depending supporting lug 32 which extends downwardly from the bottom a substantial distance for supporting the thermostat assembly and for aiding in providing the low preheat time of the cooking vessel of the present invention.

For the purpose of supplying electrical energy to the sheathed heating element 20, there is provided an electrical control circuit schematically indicated in Fig. 10, which control circuit actually includes the resistance element 22. The electrical control circuit includes a pair of terminal studs 36 and 37 which are supported in an insulating manner by the depending flange 30. Preferably, the terminal studs 36 and 37 are provided with threaded ends to which suitable fastening means such as the nuts 39 and 40 are attached. The nuts 39 clamp the studs in electrically insulated relationship to the depending flange or web 30, while the nuts 40 clamp thereto in electrically conducting relationship suitable electrical connections leading to other portions of the control circuit. In order to protect the terminal studs 36 and 37, a suitable plug guard or housing 42 is provided. This plug guard is best shown in Figs. 3 and 7 of the drawings. It will be understood that suitable insulating washers and insulating cylinders are provided to insulate the terminal studs 36 and 37 from the plug guard and the supporting web or flange 30.

As best shown in Figs. 3 and 10 of the drawings, a conducting lead 44 electrically interconnects the terminal 27 of the sheathed heating element 20 and the terminal stud 36. The conducting lead 44 preferably has one end clamped to the terminal stud 36 by the nut 40, and the other end suitably welded to the terminal 27.

For the purpose of controlling the temperature, there is inserted between the terminal 28 of the sheathed heating element 20 and the terminal stud 37, a suitable thermostatically controlled switch mechanism generally designated by the reference numeral 45 in Figs. 3 and 10 of the drawings. This thermostatically controlled switch mechanism comprises an L-shaped heat bracket 47 having a long arm 47a of the L attached by suitable fastening means 48 to the lug 32. The other arm of the L, which actually depends downwardly and is designated as 47b, supports a stack of superimposed conductors and insulating members, also including a bimetallic element 49. The bimetallic element 49 is mounted in cantilever fashion, in good heat conducting relationship with the portion 47b of the L-shaped heat bracket 47. The stack of conducting and insulating members includes an insulating plate 50 for insulating the bimetallic element from a conductor 51 electrically connected to a resilient contact support 52 supporting a movable contact 53. The resilient contact support 52 is provided with a hook-shaped extension 52a which extends through an opening 55 defined in the bimetallic element 49 to engage an insulating insert 56 supported by the end of the bimetallic element 50. Actually, the insulating insert is supported between the bifurcations 49a and 49b at the free end of the bimetallic element. As best shown in Figs. 3 and 10 of the drawings, deflection of the bimetallic element in a direction toward the center of the vessel, which will occur upon increased heating thereof, will cause the insulating insert 56 to engage the hook-shaped extension 52a and move the contact 53, which might be designated as the movable contact, away from what might be termed a stationary contact 57, supported on a resilient contact arm 58 also disposed in the stack of interposed conducting and insulating members and electrically connected to a conductor 59. This stack includes insulating members 61a and 61b. Suitable fastening means comprising the screws 60 clamp the stack of interposed conducting and insulating members, including the fixed end of the bimetallic element 49 to the portion 47b of the heat bracket 47.

For the purpose of electrically connecting the thermostatically controlled switch assembly 45 into the electrical circuit, the conductor 51 is electrically connected by a suitable lead 62 with the terminal stud 37. Similarly, the conductor 59 is electrically connected by a resistor 63 and a conductor 64 with the terminal portion 28 of the sheathed heating element 20. With this arrangement it will be apparent that when the switch is closed, or, in other words, the contacts 53 and 57 are in electrical engagement, and when the terminal studs 36 and 37 are connected as by a conventional plug connector 65 and a power cord 66 with a suitable source of electrical power, that current will flow through the sheathed heating element 20 to heat the vessel 14.

It will be apparent that in an automatic heating vessel of the type described it is desirable for the housewife to know whether the contacts are closed and, consequently, whether the heating element is energized or not, and to this end a suitable indicating lamp, generally designated by the reference numeral 67, is provided. This indicating lamp is electrically connected across the resistor 63, which is effectively a voltage dropping resistor, by suitable flexible conductors 68 and 69. The lamp 67 is preferably mounted in a suitable socket 70, which is supported on an elongated bracket 71 fastened as by a fastening means 72 to a suitable bracket 73 forming a further part of the switch assembly 45. As will become apparent from the following description, the single fastening means 72 may be removed, whereupon the bracket 71 may be moved with the lamp supported thereby in view of the flexible leads 68 and 69 to permit ready replacement of the lamp even though assembled within the housing 13 where ready access thereto is not normally afforded. In an embodiment manufactured in accordance with the present invention, the voltage dropping resistor 63 dropped the voltage to about 2½ volts, and, consequently, a 2½-volt lamp was employed.

A cooking device which is used for numerous cooking operations must be capable of being set to maintain different selected temperatures for different cooking operations in order to be satisfactory. Accordingly, the cooking device of the present invention includes means for selectively adjusting the temperature which will be maintained by the sheathed heating element 20. To this end the bracket 73 supports a suitable control rod nut 75 for threadedly receiving therein an elongated control rod 76 which supports at its inner end a suitable insulator member 77 engageable with the flexible arm 58 supporting the stationary contact 57. The adjustment rod 76 is effectively an elongated rod adapted to extend outside the housing 13, at which outer end there is supported a suitable control knob 78 formed of suitable insulating material such as a phenolic material. For the purpose of reducing the transfer of heat by conduction along the control or adjustment rod 76, the latter is provided near the end adjacent the knob 78 with a series of annular grooves 80 defining ridges therebetween which act as cooling fins, and which, moreover, reduce the conductive area of the rod for heat transfer.

As was mentioned above, due to the heat insulating nature of shortening when in a solid state, it is necessary to heat the bottom of the vessel 14 several hundred degrees higher than the actual temperature of the solid shortening contained therein in order that the shortening will reach a desired selected temperature in a minimum period of time. Consequently, in accordance with the present invention, a thermal lag is introduced by the construction described above. In the first place, the lug 32 is of relatively small area and extends downwardly from the bottom of the pot a substantial distance. Additionally, the heat bracket 47 is of substantial length to delay the conduction of heat from the lug 32 to the bimetallic element 49. Furthermore, in accordance with the present invention, the cross-sectional area of the heat bracket 47 is reduced by providing a substantial opening 82 therein which reduces the conducting area. With this arrangement the bimetallic element 49 responds with a substantial lag to the temperature of the bottom 14b of the vessel 14, whereupon the material contained within the vessel may be several hundred degrees lower in temperature than the temperature of the vessel.

The housing generally designated by the reference numeral 13 is provided for several purposes, one of which is to give the cooking device a pleasing appearance, and the other of which is to protect the housewife from the hot temperature of the cooking vessel 14. In accordance with the present invention, the housing 13 comprises a cylindrical housing portion 85 in the form of a wrap-around shell, the ends of the wrap-around being indicated at 85a in Fig. 2 of the drawings, and preferably being overlapped slightly and, if desired, spot welded or otherwise suitably joined. The shell is preferably formed of steel suitably plated to give a pleasing exterior appearance thereof. Preferably, the junction of the overlapped ends 85a of the wrap-around shell 85 is covered by a suitable plate 87 which may be a sort of cook guide in that it may have suitable indicia thereon indicating various cooking temperatures or instructions for operating the cooking device of the present invention. As illustrated, the plate or cook guide is fastened as by suitable fastening means 88 to the ends of the wrap-around shell 85. Attached to the upper end of the wrap-around housing 85 are a pair of handles 90 which have a cross section preferably of that shown in Fig. 7 of the drawings. These handles are preferably attached by suitable fastening means including nuts 91 which may be welded or otherwise secured to the interior of the wrap-around shell 85. If desired, the underside of the handles 90, which preferably are molded from a phenolic composition or other suitable insulating material, are provided with grooves indicated at 93 in Fig. 3 of the drawings to permit the housewife to grasp the handles without the slipping of her fingers thereon. However, in a commercial embodiment built in accordance with the present invention, the underside of the handles 90 was smooth, and, moreover, was found to be entirely satisfactory.

In accordance with the present invention, the upper end of the cylindrical shell 85 is inserted within the groove 16 defined on the underside of the flange 15. To complete the housing, a suitable base 94, preferably formed of steel and of shallow bowl-shaped configuration, is provided. To provide a smooth junction between the wrap-around shell 85 and the base 94, the lower end of the shell 85 is preferably provided with a peripheral flange 85a to define a shoulder 85b against which the upper end of the base 94 abuts. To provide a pleasing appearance, the base 94 is preferably enameled in some dark color, such as black, thereby contrasting with the highly polished shell 85. The color of the base 94 is preferably the same as that of the handles 90 and the knob 78.

For the purpose of securing the base 94, and, consequently, also the shell 85, in spaced relationship with the vessel 14, suitable studs 96 are threadedly engaged with the threaded openings in the lugs 31, and, in turn, suitable screws or other fastening means 98 secure the base 94 to the studs 96. With this arrangement the base also holds the shell 85 in the groove 16 and maintains the entire housing 13 in assembled relationship with the vessel 14. It will be apparent that by virtue of the studs 96 the base 94 is disposed a substantial distance from the bottom of the vessel 14 so as to define a chamber 97 beneath the bottom of the vessel 14 for the electrical control circuit, including the thermostatic switch assembly 45 described above, as well as the control rod 76 and associated mechanism. Moreover, the base is provided with a flanged opening 99 adjacent the plug guard 42, with the flange surrounding the opening adapted to engage the interior of the plug guard 42 as shown in Fig. 7 of the drawings. Additionally, the base is provided with a central opening affording access to the chamber 97 to make the necessary adjustments of the thermostatic control switch 45, to replace the light bulb 67 and the like. This opening is closed by a suitable bottom cover 100 having a peripheral flange overlapping the base 94 and held in place by a suitable screw 101 threadedly engaging a central stud 102, which is identical with the studs 96 except that it engages a lug 31 at the center of the vessel 14. Preferably, also, there are secured to the base 94 a plurality of feet 105 formed of a suitable phenolic material or the like.

In order to permit the control rod 76 to extend outside the base, the base is provided with a suitable opening through a depending resilient member 107 (Figs. 5 and 9 of the drawings) integrally formed with the base 94. This depending member includes an opening coaxially disposed with respect to the control rod nut 75 so as to effectively provide a bearing for the end of the control rod 76 remote from the nut 75. The base also includes an opening through which the lamp 67 may protrude.

For the purpose of providing a suitable illuminated dial adjacent the control knob 78, there is provided a control panel 109, preferably formed of a molded phenolic compound which may be secured over the opening through which the control knob extends and which conforms to the contour of the base and provides a pleasing appearance as comprising a sort of extension of the cook guide 87. Preferably, the control panel 109 includes a forwardly extending cylindrical portion 109a having a flange 109b for retaining therein a suitable dial 110, preferably formed of a semitransparent or translucent material such as polystyrene or the like. This dial includes suitable indicia thereon such as the word "Simmer" and the word "Off." Additionally, it also includes a temperature scale, including the range normally used for cooking and deep fat frying. The dial 110 is preferably inserted from the right as viewed in Fig. 5 of the drawings, in engagement with the peripheral flange 109b. The dial, furthermore, includes a suitable lug 112 (Fig. 9) formed integrally therewith for engagement with a projection 113 (Fig. 5) on the knob 78, limiting the maximum clockwise and counterclockwise positions of the knob 78, and, consequently, the adjusting rod 76. In order to hold the dial in its proper angular position in the extension 109a of the panel 109, the panel 109 and the dial 110 are provided with cooperating grooves and lugs 114 and 115. The dial 110 is preferably provided with a central recess 116 for the lug 112, and a central opening through which the end of the adjusting rod 76 may protrude.

In order that the dial 110, which preferably is of translucent material, may be uniformly illuminated by the lamp 67, a reflector 118 is preferably provided, which reflector includes cooperating openings for the end of the lamp 67, as well as for the adjusting rod 76. The reflector is illustrated as a somewhat cup-shaped reflector interposed between the dial 110 and the resilient projection 107 of the base 94. As a result, the resilient projection 107 maintains all the parts, including the dial 110 and the reflector 118, in assembled relationship when the control panel 109 is suitably secured as by fastening means 119 to the base 94. Preferably, the control knob 78 can be adjustably positioned on the shaft 76 for initial calibration of the thermostat control means.

For certain cooking operations it is desirable that the cooking vessel 14 be provided with a suitable cover, and to this end there is provided a cover 120, provided with means defining an inturned flange 121 capable of being inserted within the top of the vessel 14. A suitable shoulder 122 is defined for resting on the peripheral flange 15 of the vessel 14. This cover is preferably provided with an insulating knob 123 fastened thereto by a suitable fastening means 124. To prevent the knob from pivoting about the suitable fastening means 124, the knob is preferably provided with integral projections 125 which extend into cooperating openings defined in the cover 120.

Figure 2:
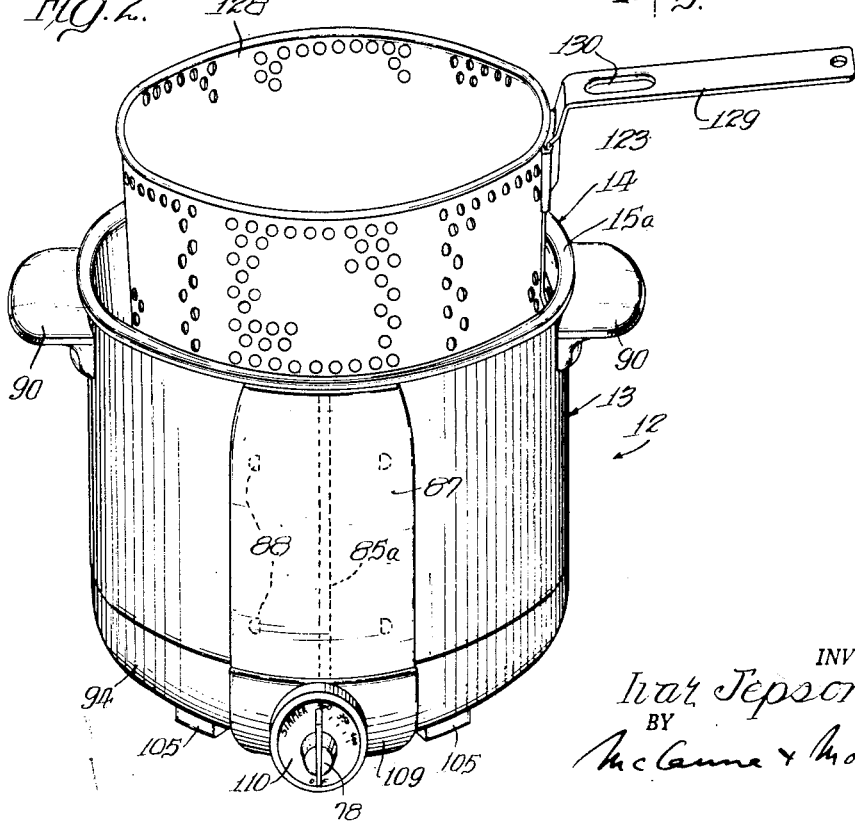
Fig. 2 is a view similar to Fig. 1 with the cover of the cooking device of the present invention removed to show the device in use as a deep fat fryer.

For deep fat frying it is desirable to have a suitable draining basket, and, as illustrated in Figs. 2, 7 and 8, such a basket is designated by the reference numeral 128. This basket is preferably formed of aluminum and is provided with a large number of perforations at the bottom and sides thereof.

Obviously, the basket 128 must be provided with a suitable handle so that the housewife may manipulate the same to remove the material being deep fat fried from the shortening for draining purposes. For storing purposes, however, a handle is undesirable, and, in accordance with the present invention, a demountable handle 129 is provided of L-shaped configuration, as best shown in Fig. 4 of the drawings. One leg 129a of the L-shaped handle 129 provides a handle portion and includes a substantial opening 130 therein to reduce the cross-sectional area and, hence, the heat conduction to the handle. The other leg 129b of the L-shaped handle 129 includes a portion 131 in the form of laterally extending ears which may be received within a handle clip 133 suitably fastened as by rivets or the like to the upper portion of the basket 128. When the ears 131 are inserted from the bottom into the handle clip 133, the handle is securely fastened to the basket. Mere movement in a downward direction of the handle 129 relative to the basket 128, as viewed in Fig. 4 of the drawings, disconnects the handle from the handle clip 133 on the basket 128.

So that the housewife need not hold the basket in the draining position, there is provided in accordance with the present invention suitable supporting means for supporting the basket 128 in a draining position, as indicated in Fig. 2 of the drawings. To this end the leg 129b of the L-shaped handle 129 is provided with a downwardly projecting portion, including an extension 135, which is receivable within a clip 136 suitably riveted or otherwise secured to the inner upper part of the vessel 14, as best shown in Figs. 7 and 8 of the drawings. The basket may be supported in the draining position by merely lifting the portion 135 of the L-shaped handle 129 above the clip 136, and then sliding the portion 135 into the clip from the top, whereupon the basket is rigidly supported in draining position. With this arrangement the handle may readily be removed from the basket 128 for storing purposes and cleaning of the parts is greatly simplified.

In view of the detailed description included above, the operation of the cooking device of the present invention will readily be understood by those skilled in the art. When it is desired to perform a deep fat frying operation, the power cord 66 is suitably connected between a source of power and the terminal studs 36 and 37. The control knob 78 is then moved to a preheat position, or, in other words, to the maximum temperature setting of the control knob. Due to the thermal lag of the thermostatic control switch mechanism 45, the switch comprising contacts 53 and 57 will not be opened until the shortening has reached the desired cooking temperature, even though the bottom of the vessel might be several hundred degrees above the final desired temperature. A relatively short time is required with applicant's invention to bring the shortening for deep fat frying up to the proper temperature. In a commercial embodiment built in accordance with the present invention, about thirteen minutes is required. At this time the bimetallic element 49 will open the circuit and cause the lamp 67 to be de-energized. The knob should then be set to the desired temperature, and the deep fat frying operation may be performed, using the basket in the obvious manner already described.

While there has been illustrated and described what is at present believed to be the preferred embodiment of the present invention, numerous changes and modifications will occur to those skilled in the art, and it is aimed in the appended claims to cover all such changes and modifications as fall within the true spirit and scope of the present invention.

What is claimed as new and desired to be secured by Letters Patent of the United States is:

An electric deep fat fryer for converting shortening in solid form which is of a heat insulating character to a liquid in a minimum of time and then maintaining said liquid at a selected constant temperature, comprising a cooking vessel, an electric heating element mounted in good heat transfer relationship with said vessel, an electric circuit comprising thermostatic control means including a bimetallic element responsive to the temperature of said vessel for controlling the supply of electrical energy to said heating element and hence controlling the heat delivered to said vessel, manually actuable control means for controlling said selected temperature, means for introducing a substantial thermal lag in the response of said thermostatic control means to the temperature of said vessel thereby to permit a much higher initial temperature of said vessel to overcome the heat insulating character of said solid shortening, said last mentioned means comprising a conducting support for said bimetallic element attached to said vessel and comprising an elongated heat path of restricted area, and means for restricting the heat path along said manually actuable control means said last-mentioned means comprising an opening defined in said elongated heat path, which opening takes up a substantial portion of the width of said elongated heat path.

References Cited in the file of this patent

UNITED STATES PATENTS

| | | |
|---|---|---|
| 493,422 | Capek | Mar. 14, 1893 |
| 1,232,360 | Miller | July 3, 1917 |
| 1,394,612 | Dernell | Oct. 25, 1921 |
| 1,688,039 | Drumm | Oct. 16, 1928 |
| 2,109,212 | Ehrgott | Feb. 22, 1938 |
| 2,134,675 | Shroyer | Oct. 25, 1938 |
| 2,187,888 | Nacumsohn | Jan. 23, 1940 |
| 2,244,145 | Erickson | June 3, 1941 |
| 2,314,467 | Tubbs | Mar. 23, 1943 |
| 2,386,278 | Strother | Oct. 9, 1945 |
| 2,518,566 | Osterheld | Aug. 15, 1950 |
| 2,522,718 | Huck | Sept. 19, 1950 |
| 2,537,167 | Snyder | Jan. 9, 1951 |
| 2,597,695 | Braski et al. | May 20, 1952 |

FOREIGN PATENTS

| | | |
|---|---|---|
| 570,187 | France | Jan. 14, 1924 |